(12) United States Patent
Cheng et al.

(10) Patent No.: US 10,613,594 B2
(45) Date of Patent: Apr. 7, 2020

(54) SPEAKER SOUND CAVITY STRUCTURE OF MOBILE TERMINAL, AND MOBILE TERMINAL

(71) Applicant: JRD Communication Inc., Shenzhen, Guangdong (CN)

(72) Inventors: Huajun Cheng, Shenzhen (CN); Benzhi Ye, Shenzhen (CN); Ruilin Hou, Shenzhen (CN)

(73) Assignee: JRD Communication Inc., Shenzhen, Guangdong (CN)

( * ) Notice: Subject to any disclaimer, the term of this patent is extended or adjusted under 35 U.S.C. 154(b) by 35 days.

(21) Appl. No.: 15/744,860

(22) PCT Filed: Mar. 16, 2017

(86) PCT No.: PCT/CN2017/076993
§ 371 (c)(1),
(2) Date: Jan. 15, 2018

(87) PCT Pub. No.: WO2018/129801
PCT Pub. Date: Jul. 19, 2018

(65) Prior Publication Data
US 2019/0011958 A1    Jan. 10, 2019

(30) Foreign Application Priority Data
Jan. 16, 2017    (CN) .......................... 2017 1 0028649

(51) Int. Cl.
*G06F 1/16* (2006.01)
*H04R 1/02* (2006.01)
(Continued)

(52) U.S. Cl.
CPC .......... *G06F 1/1688* (2013.01); *G06F 1/1698* (2013.01); *H04M 1/035* (2013.01);
(Continued)

(58) Field of Classification Search
CPC ...... H04R 1/025; H04R 1/2888; H04R 1/323; H04R 2499/11; H04R 2499/15;
(Continued)

(56) References Cited

U.S. PATENT DOCUMENTS 9,042,592 B2 * 5/2015 Chen .................. H04R 1/28
379/430
2002/0187758 A1 * 12/2002 Ylitalo .................. H01Q 1/242
455/575.1

(Continued)

FOREIGN PATENT DOCUMENTS

CN        102348002 A    2/2012
CN        202679442 U    1/2013
(Continued)

*Primary Examiner* — Davetta W Goins
*Assistant Examiner* — Daniel R Sellers
(74) *Attorney, Agent, or Firm* — Mark M. Friedman

(57) ABSTRACT

In a speaker sound cavity structure of a mobile terminal of the present disclosure, the speaker sound cavity structure includes an antenna supporting member arranged on a mobile terminal. The antenna supporting member includes a sound-guiding groove configured as a transmission channel for transmitting sound in the speaker sound cavity structure of the mobile terminal. A lead-out hole is configured to lead the sound in a speaker sound cavity into a new speaker sound cavity of the mobile terminal. A lead-in hole is configured to guide the sound in the speaker sound cavity of into the new speaker sound cavity of the mobile terminal. The speaker sound cavity structure is configured to guide the sound of the speaker sound cavity to the new speaker sound cavity of the mobile terminal, so that the space in the speaker sound cavity of the mobile terminal is expanded.

17 Claims, 5 Drawing Sheets

(51) Int. Cl.
*H04M 1/03* (2006.01)
*H04R 1/28* (2006.01)
*H04R 1/32* (2006.01)

(52) U.S. Cl.
CPC ........... *H04R 1/025* (2013.01); *H04R 1/2888* (2013.01); *H04R 1/323* (2013.01); *H04R 1/288* (2013.01); *H04R 2201/029* (2013.01); *H04R 2499/11* (2013.01)

(58) Field of Classification Search
CPC ..... H04R 1/288; G06F 1/1688; G06F 1/1698; H04M 1/035
USPC ........................................................ 381/333
See application file for complete search history.

(56) References Cited

U.S. PATENT DOCUMENTS

| | | | |
|---|---|---|---|
| 2004/0253995 A1 | 12/2004 | Matsumoto et al. | |
| 2013/0156245 A1* | 6/2013 | Dix ...................... | H04R 1/2873 |
| | | | 381/353 |
| 2015/0189412 A1* | 7/2015 | Shi ........................ | H04M 1/035 |
| | | | 381/345 |
| 2017/0055065 A1* | 2/2017 | Zhang ................. | H04R 1/2803 |

FOREIGN PATENT DOCUMENTS

| | | |
|---|---|---|
| CN | 203377921 U | 1/2014 |
| CN | 103856864 A | 6/2014 |
| CN | 204069237 U | 12/2014 |
| CN | 204156917 U | 2/2015 |
| CN | 105376680 A | 3/2016 |
| CN | 105959835 A | 9/2016 |

\* cited by examiner

SPEAKER SOUND CAVITY STRUCTURE OF MOBILE TERMINAL, AND MOBILE TERMINAL

CROSS REFERENCE TO RELATED APPLICATION

This application claims the priority of International Application No. PCT/CN2017/076993, filed on Mar. 16, 2017, which claims priority to Chinese Application No. 201710028649.8, filed on Jan. 16, 2017. The entire disclosures of each of the above applications are incorporated herein by reference.

BACKGROUND OF THE INVENTION

Field of Invention

The present disclosure relates to a technical field of mobile terminals, and more particularly to a speaker sound cavity structure of a mobile terminal, and a mobile terminal.

Description of Prior Art

Currently, a thickness of a mobile terminal is increasingly becoming thinner, and a requirement for smaller size mobile terminals is increasing. Limited space in the mobile terminal is more obvious, and thus, space for a speaker sound cavity structure in the mobile terminal is certainly affected.

FIG. 1 is an illustrative diagram of a speaker sound cavity structure 900 in related art. Generally, when an antenna supporting member is covered by the mobile terminal, a front shell, aluminum magnesium alloy, a speaker, and the antenna supporting member are assembled together to form a sealing sound cavity. The speaker sound cavity structure 900 is tightly mounted on a housing of the mobile terminal using screws, so that volume of the speaker sound cavity structure 900 is calculated to be 357.14 mm$^3$, for example.

Influence of the speaker sound cavity structure on tone quality of the mobile terminal is increased, and in the same sound source and the same speaker, the tone difference of the playing effect in different audio cavities can be also increased. For example, some of the sound cavities are more attractive, and some of the sound cavities are relatively monotonous. A reasonable sound cavity design can enable musical sound to be more pleasing. The size of the speaker sound cavity structure affects the low-frequency replay of the speaker. In the speaker sound cavity structure, if the cavity is larger, sound propagation is facilitated, so that standing waves due to a narrow sound cavity are avoided, and the sound is mellow and sweet.

Conventionally, since light and thinner mobile terminals can limit a sound cavity design, a larger volume of the speaker sound cavity structure 900 cannot be easily achieved.

Therefore, there is a need to improve and develop a conventional speaker sound cavity structure.

SUMMARY OF THE INVENTION

The present disclosure provides a speaker sound cavity structure of a mobile terminal, and the mobile terminal, and aims to solve the problem that larger volumes of the speaker sound cavity structure cannot be easily achieved.

For the above-mentioned problem, the present disclosure sets forth the following technical schemes.

In one embodiment, the present disclosure provides a speaker sound cavity structure, comprising an antenna supporting member arranged on a mobile terminal, wherein the antenna supporting member includes the following elements.

A sound-guiding groove is configured as a transmission channel for transmitting sound in a speaker sound cavity structure of the mobile terminal, wherein the sound-guiding groove is a recess arranged on the antenna supporting member of the mobile terminal.

A lead-out hole is configured to lead the sound in a speaker sound cavity of the mobile terminal into a new speaker sound cavity, wherein the lead-out hole is a through hole that passes through the antenna supporting member of the mobile terminal, and is arranged in the sound-guiding groove.

A lead-in hole is configured to guide the sound in the speaker sound cavity of the mobile terminal into the new speaker sound cavity, wherein the lead-in hole is a through hole that passes through the antenna supporting member of the mobile terminal and is arranged in the sound-guiding groove.

In one embodiment, the lead-out hole and the lead-in hole are arranged at two ends of the sound-guiding groove.

In one embodiment, a polyethylene terephthalate film or foam is arranged on the sound-guiding groove.

In one embodiment, foam is arranged on the speaker sound cavity of the mobile terminal and the new speaker sound cavity of the mobile terminal.

In one embodiment, the antenna supporting member is fixedly connected with the mobile terminal using screws.

In one embodiment, a width of the sound-guiding groove is between 0.5-2 mm.

In one embodiment, the present disclosure provides a method of expanding a speaker sound cavity of a mobile terminal. The method includes the following steps.

In step A, a lead-out hole is arranged on an antenna supporting member for leading sound of the speaker sound cavity of the mobile terminal outside.

In step B, a sound-guiding groove is arranged on the antenna supporting member for transmitting the sound of the speaker sound cavity.

In step C, a lead-in hole is arranged on the antenna supporting member for leading the sound of the speaker sound cavity to a new speaker sound cavity of the mobile terminal.

The lead-out hole and the lead-in hole are arranged at two ends of the sound-guiding groove.

In one embodiment, a polyethylene terephthalate film or foam is arranged on the sound-guiding groove.

In one embodiment, the present disclosure provides a mobile terminal, including a speaker sound cavity structure, wherein the speaker sound cavity structure has an antenna supporting member arranged on the mobile terminal.

In the present disclosure, the speaker sound cavity structure is configured to guide the sound of the speaker sound cavity of the terminal to a new speaker sound cavity without changing the stacking structure of the mobile terminal, so that the space in the speaker sound cavity of the mobile terminal is expanded, and the tone quality is improved.

DETAILED DESCRIPTION OF THE PREFERRED EMBODIMENTS

The following embodiments refer to the accompanying drawings for exemplifying specific implementable embodiments of the present disclosure. It should be noted that the exemplary described embodiments are used to describe and understand the present disclosure, but the present disclosure is not limited thereto.

In embodiments of the present disclosure, SPK refers to a speaker (i.e., a loudspeaker).

Figure 1:
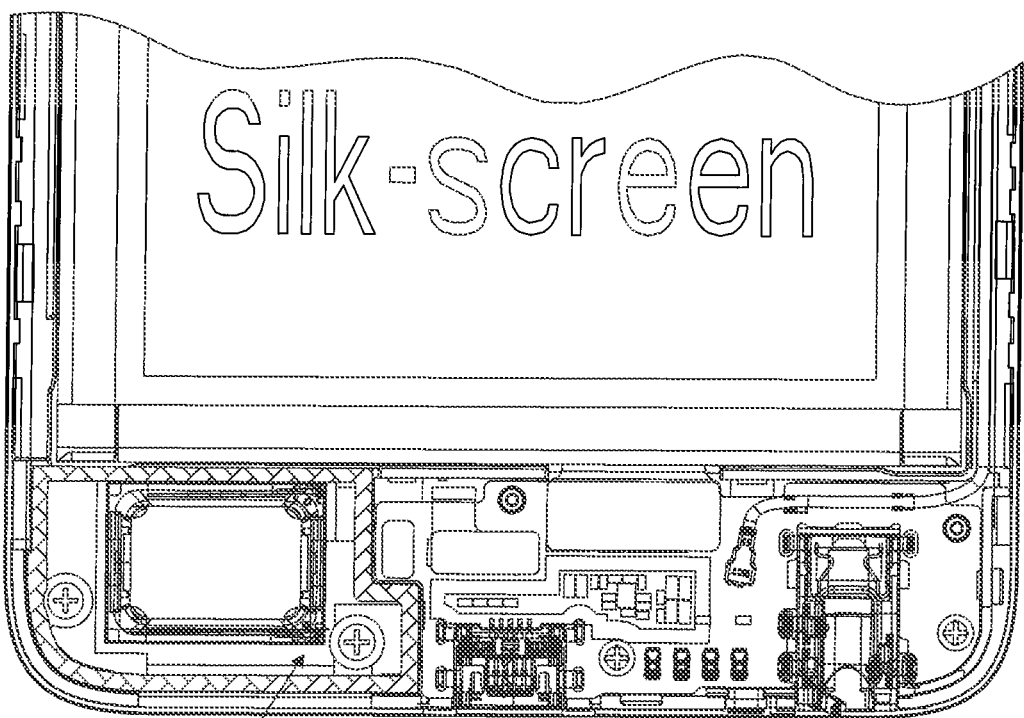
FIG. 1 is an illustrative diagram of a conventional speaker sound cavity structure.
Figure 2:
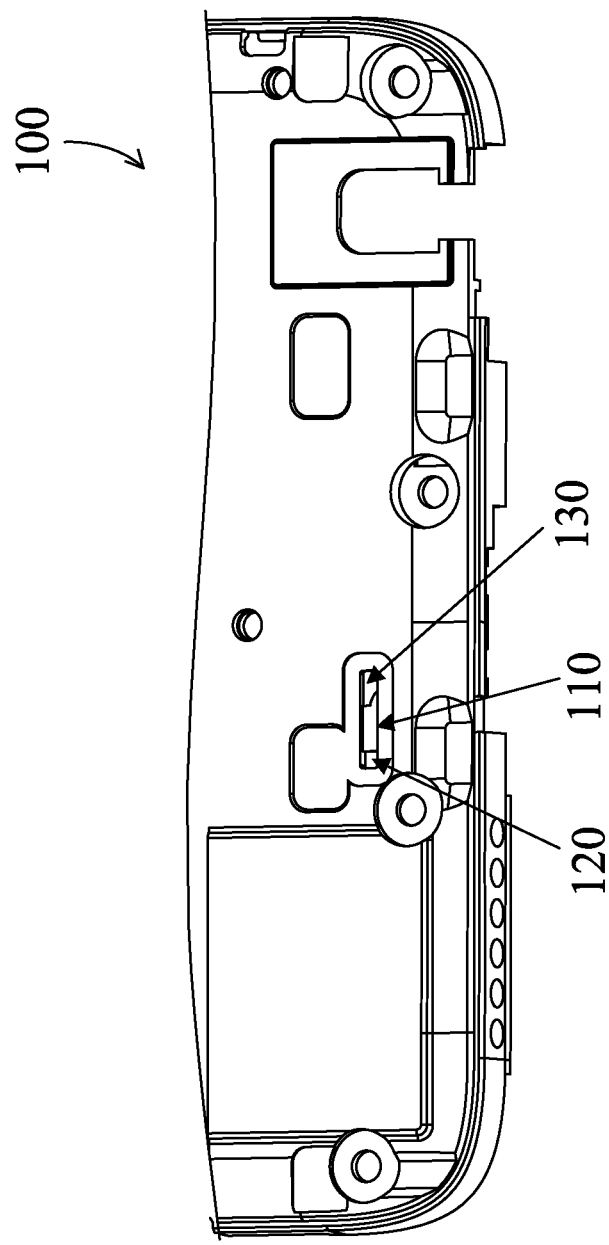
FIG. 2 is an illustrative diagram of a sound-guiding groove arranged on an antenna supporting member in a speaker sound cavity structure of a mobile terminal according to one embodiment of the present disclosure.

A SPK sound cavity structure of a mobile terminal of the present disclosure includes an antenna supporting member 100 arranged on the mobile terminal. FIG. 2 is an illustrative diagram of a sound-guiding groove arranged on the antenna supporting member 100 in a speaker sound cavity structure of a mobile terminal according to one embodiment of the present disclosure. As shown in FIG. 2, the antenna supporting member 100 of the mobile terminal includes the following elements.

A sound-guiding groove 110 is configured as a transmission channel for transmitting sound in a speaker sound cavity 200 of the mobile terminal. The sound-guiding groove 110 serves as the transmission channel for transmitting the sound in the speaker sound cavity 200 of the mobile terminal to a new speaker sound cavity 300 of the mobile terminal. The sound-guiding groove 110 is a recess arranged on the antenna supporting member 100 of the mobile terminal.

A lead-out hole 120 is configured to lead the sound in the speaker sound cavity 200 of the mobile terminal into the new speaker sound cavity 300. The lead-out hole 120 is a through hole that passes through the antenna supporting member 100 of the mobile terminal and is arranged in the sound-guiding groove 110.

A lead-in hole 130 is configured to guide the sound in the speaker sound cavity 200 of the mobile terminal into the new speaker sound cavity 300. The lead-in hole 130 is a through hole that passes through the antenna supporting member 100 of the mobile terminal and is arranged in the sound-guiding groove 110.

In the speaker sound cavity structure of the mobile terminal of the present disclosure, the antenna supporting member 100 includes the lead-out hole 120, the sound-guiding groove 110, and the lead-in hole 130. After the antenna supporting member 100 has been assembled with the mobile terminal, the lead-out hole 120 is arranged above the speaker sound cavity 200, and the lead-in hole 130 is arranged above the speaker sound cavity 300, so that the sound of the speaker sound cavity 200 of the mobile terminal can be transmitted to the new speaker sound cavity 300 of the mobile terminal through the sound-guiding groove 110. Thus, the space in the speaker sound cavity of the mobile terminal is increased, and an original structure of the speaker sound cavity is not affected. The space in the speaker sound cavity of the mobile terminal can be increased, without changing the structure of the mobile terminal and without increasing the thickness of the mobile terminal.

In one embodiment, the new speaker sound cavity 300 can be a closed chamber that is used in a stack of the mobile terminal except the speaker sound cavity 200.

In FIG. 2, the lead-out hole 120 and the lead-in hole 130 are arranged at two ends of the sound-guiding groove 110. The lead-out hole 120 is close to the new speaker sound cavity 300 of the mobile terminal, and the lead-in hole 130 is close to the speaker sound cavity 200 of the mobile terminal. In one embodiment, a diameter of the lead-out hole 120 and a diameter of the lead-in hole 130 are between 0.5-2 mm. The width of the sound-guiding groove 110 is between 0.5-2 mm. The lead-out hole 120 and the lead-in hole 130 are arranged at edges of the speaker sound cavity 200 and the new speaker sound cavity 300 of the mobile terminal. Furthermore, since the lead-out hole 120 and the lead-in hole 130 are arranged at the two ends of the sound-guiding groove 110, length of the sound-guiding groove 110 can be reduced to a shorter slot, and an occupied space in the antenna supporting member 100 of the mobile terminal is minimized. Meanwhile, if the length of the sound-guiding groove 110 is reduced, propagation speed and the propagation efficiency of the sound are facilitated. Therefore, the problem that sound is weakened and leaked due excessively long propagation distance of a guiding groove is solved, and the tone quality of the mobile terminal is improved.

Figure 3:
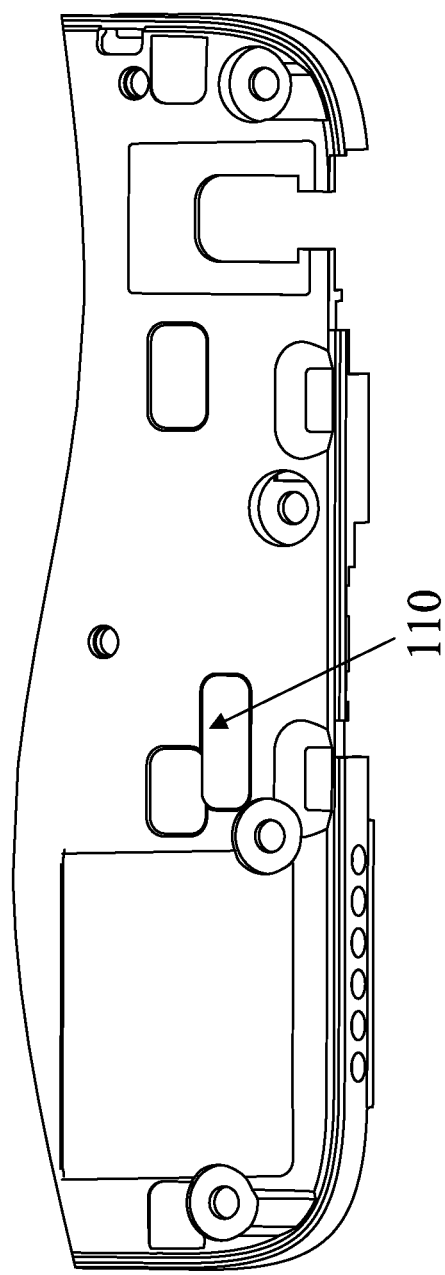
FIG. 3 is an illustrative diagram of a polyethylene terephthalate (PET) film or foam arranged on the sound-guiding groove in FIG. 2 according to one embodiment of the present disclosure.

FIG. 3 is an illustrative diagram of a polyethylene terephthalate (PET) film or foam arranged on the sound-guiding groove in FIG. 2 according to one embodiment of the present disclosure. As shown in FIG. 3, a PET film or foam is arranged on the sound-guiding groove 110, and the sound-guiding groove 110 is covered with a PET film or foam, thereby preventing sound leakage. The sound transmission efficiency is improved, and the tone quality of the mobile terminal is improved.

Figure 4:
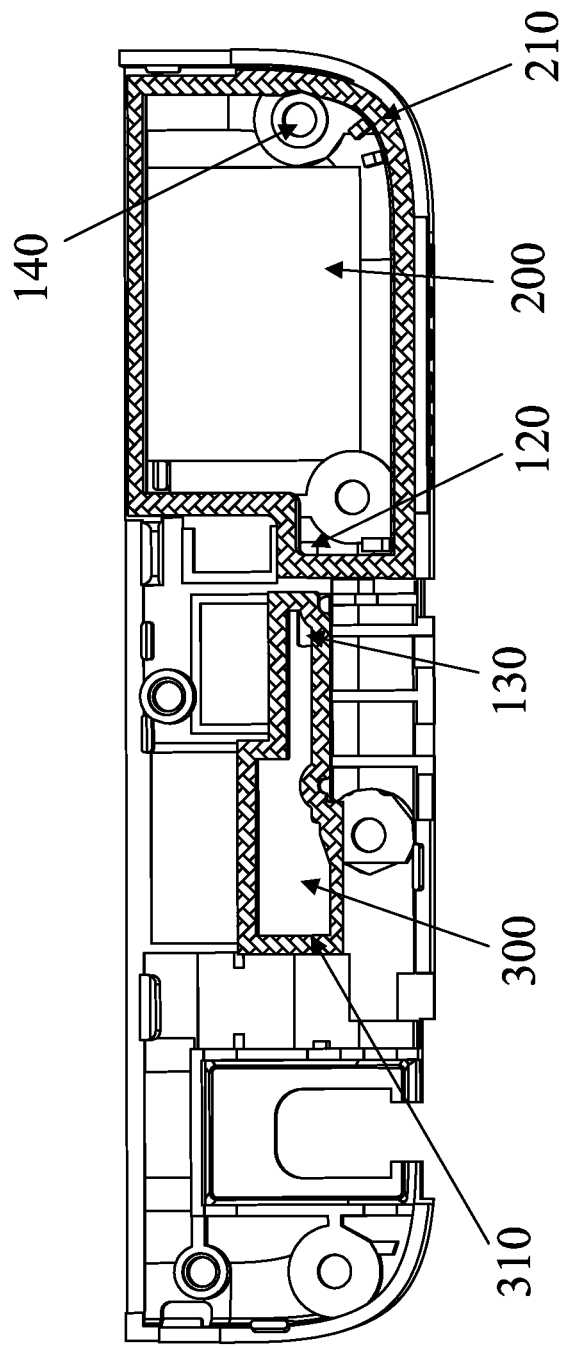
FIG. 4 is an illustrative back structural diagram of the sound-guiding groove shown in FIG. 2 according to one embodiment of the present disclosure.

FIG. 4 is an illustrative back structural diagram of the sound-guiding groove shown in FIG. 2 according to one embodiment of the present disclosure. Foam is arranged on the speaker sound cavity 200 and the new speaker sound cavity 300 of the mobile terminal. Sound cavity foam 210 is located on the speaker sound cavity 200, and sound cavity foam 310 is located on the new speaker sound cavity 300, so that a sealing effect is improved, and the tone quality of the mobile terminal is increased. In one embodiment, the width of the sound cavity foam is between 0.3-1.5 mm, so that the width of the sound cavity foam is smaller than the width of the lead-out hole 120 and the lead-in hole 130. Therefore, the lead-out hole 120 and the lead-in hole 130 cannot be blocked by the sound cavity foam, so that the sound is led from the speaker sound cavity 200 to the new speaker sound cavity 300 of the mobile terminal.

Referring to FIG. 4, a screw hole 140 is arranged at the antenna supporting member 100. The antenna supporting member 100 is fixedly connected with the mobile terminal by screws. The antenna supporting member 100 is locked on a housing of the mobile terminal by fastening the screws to the screw holes 140, and the screws can plug the screw holes 140, so that sound leakage is avoided. Meanwhile, the antenna supporting member 100 is locked on the housing of the mobile terminal to increase the sealing effect of the speaker sound cavity of the mobile terminal, and the tone quality is improved.

In one embodiment, the speaker sound cavity structure of the mobile terminal is used in a mobile phone.

The present disclosure further provides a method of expanding a speaker sound cavity of a mobile terminal. The method includes the following steps.

In step A, a lead-out hole is arranged on an antenna supporting member for leading sound of the speaker sound cavity of the mobile terminal outside.

In step B, a sound-guiding groove is arranged on the antenna supporting member for transmitting the sound of the speaker sound cavity.

In step C, a lead-in hole is arranged on the antenna supporting member for leading the sound of the speaker sound cavity to the new speaker sound cavity of the mobile terminal.

In one embodiment of the method of expanding the speaker sound cavity of the mobile terminal, the lead-out hole and the lead-in hole are arranged at two ends of the sound-guiding groove.

In one embodiment of the method of expanding the speaker sound cavity of the mobile terminal, a PET film or foam is arranged on the sound-guiding groove.

The present disclosure further provides a mobile terminal. The mobile terminal includes a speaker sound cavity structure, wherein the speaker sound cavity structure has an antenna supporting member arranged on the mobile terminal. The speaker sound cavity structure of the mobile terminal is used for introducing the sound in the original speaker sound cavity into a new speaker sound cavity without changing the stacking structure of the mobile terminal. The space in the speaker sound cavity 200 of the mobile terminal is expanded, so that the space in a rear sound cavity of the speaker sound cavity structure is expanded. In other words, the new speaker sound cavity 300 serves as the rear sound cavity of the speaker sound cavity structure. In a design of the mobile terminal, a larger rear sound cavity of the speaker sound cavity structure can easily separate the front sound wave and the rear sound wave of the sound divide, so that the sound is more round and sweet, and the sound quality is better.

Figure 5:
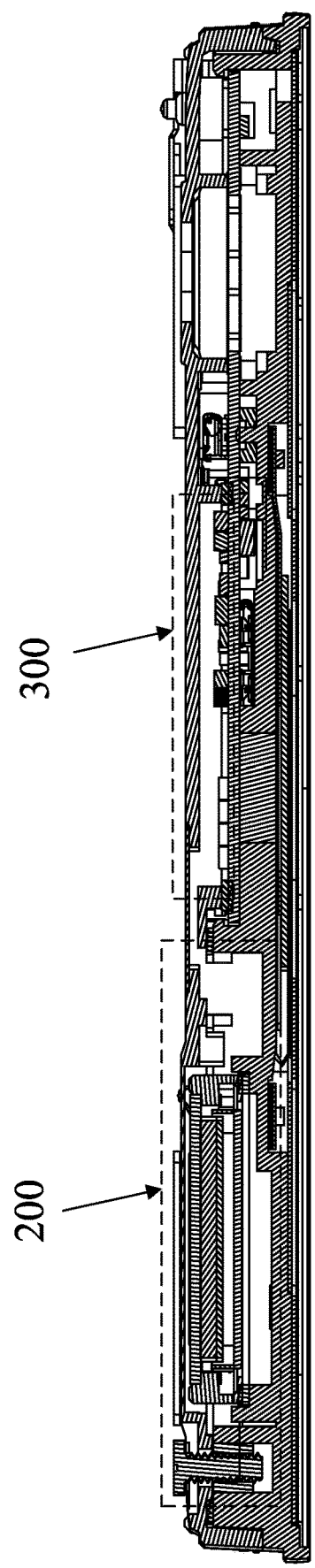
FIG. 5 is an illustrative cross-sectional diagram of the mobile terminal according to one embodiment of the present disclosure.

FIG. 5 is an illustrative cross-sectional diagram of the mobile terminal according to one embodiment of the present disclosure. For example, the space in the new speaker audio cavity 300 of the mobile terminal is 73.99 mm$^3$, the space in the original speaker audio cavity 200 is 357.14 mm$^3$, where the total space is expanded to the sum of 357.14 mm$^3$ and 73.99 mm$^3$ that is equal to 431.13 mm$^3$, and an enlargement ratio is 17.16%. Using the hardware CNC Mockup test of the mobile terminal, the capacity expansion can meet the requirement of hardware audio performance.

As is understood by persons skilled in the art, the foregoing preferred embodiments of the present disclosure are illustrative rather than limiting of the present disclosure. It is intended that they cover various modifications and similar arrangements be included in the spirit and scope of the present disclosure, the scope of which should be accorded the broadest interpretation so as to encompass all such modifications and similar structures.

What is claimed is:

1. A speaker sound cavity structure, comprising an antenna supporting member arranged on a mobile terminal, wherein the antenna supporting member comprises:
    a sound-guiding groove configured as a transmission channel for transmitting sound in an original speaker sound cavity of the mobile terminal, wherein the sound-guiding groove is a recess arranged on the antenna supporting member of the mobile terminal, and the sound-guiding groove is arranged near a bottom edge of a housing of the mobile terminal and along a direction substantially parallel to the bottom edge of the mobile terminal and substantially perpendicular to a right edge and a left edge of the mobile terminal;
    a lead-out hole configured to lead the sound in the original speaker sound cavity of the mobile terminal into a new speaker sound cavity, wherein the lead-out hole is a through hole that passes through the antenna supporting member of the mobile terminal, and is arranged at one end of the sound-guiding groove that connects an edge of the original speaker sound cavity; and
    a lead-in hole configured to guide the sound in the original speaker sound cavity of the mobile terminal into the new speaker sound cavity, wherein the lead-in hole is a through hole that passes through the antenna supporting member of the mobile terminal and is arranged at the other end of the sound-guiding groove that connects an edge of the new speaker sound cavity.

2. The speaker sound cavity structure of claim 1, wherein the lead-out hole and the lead-in hole are arranged at two ends of the sound-guiding groove, a bottom edge of the original speaker sound cavity is formed on an inner surface of the bottom edge of the housing of the mobile terminal, and a side edge of the original speaker sound cavity is formed on an inner surface of a side edge of the housing of the mobile terminal.

3. The speaker sound cavity structure of claim 1, wherein a polyethylene terephthalate film or foam is arranged on the sound-guiding groove.

4. The speaker sound cavity structure of claim 1, wherein foam is arranged on the original speaker sound cavity of the mobile terminal and the new speaker sound cavity of the mobile terminal.

5. The speaker sound cavity structure of claim 4, wherein a diameter of the lead-out hole and a diameter of the lead-in hole are between 0.5-2 mm, a width of the foam is between 0.3-1.5 mm, and the width of the foam is less than a width of the lead-out hole and the lead-in hole.

6. The speaker sound cavity structure of claim 1, wherein the antenna supporting member is fixedly connected with the mobile terminal using screws.

7. The speaker sound cavity structure of claim 1, wherein a width of the sound-guiding groove is between 0.5-2 mm.

8. A method of expanding a speaker sound cavity of a mobile terminal, the method comprising steps of:
    step A, arranging a lead-out hole on an antenna supporting member for leading sound of an original speaker sound cavity of the mobile terminal outside;
    step B, arranging a sound-guiding groove on the antenna supporting member for transmitting the sound of the original speaker sound cavity, wherein the sound-guiding groove is a recess arranged on the antenna supporting member of the mobile terminal, and the sound-guiding groove is arranged near a bottom edge of a housing of the mobile terminal and along a direction substantially parallel to the bottom edge of the mobile terminal and substantially perpendicular to a right edge and a left edge of the mobile terminal; and
    step C, arranging a lead-in hole on the antenna supporting member for leading the sound of the original speaker sound cavity to a new speaker sound cavity of the mobile terminal;
    wherein the lead-out hole and the lead-in hole are arranged at two ends of the sound-guiding groove, and wherein the lead-out hole is arranged at one end of the sound-guiding groove and an edge of the original speaker sound cavity, and the lead-in hole is arranged at the other end of the sound-guiding groove and an edge of the new speaker sound cavity.

9. The method of expanding the speaker sound cavity of the mobile terminal of claim 8, wherein a bottom edge of the original speaker sound cavity is formed on an inner surface of the bottom edge of the housing of the mobile terminal, and a side edge of the original speaker sound cavity is formed on an inner surface of a side edge of the housing of the mobile terminal.

10. The method of expanding the speaker sound cavity of the mobile terminal of claim 8, wherein foam is arranged on the original speaker sound cavity of the mobile terminal and the new speaker sound cavity of the mobile terminal, wherein a width of the sound-guiding groove is between 0.5-2 mm, and wherein a diameter of the lead-out hole and a diameter of the lead-in hole are between 0.5-2 mm, a width of the foam is between 0.3-1.5 mm, and the width of the foam is less than a width of the lead-out hole and the lead-in hole.

11. A mobile terminal, comprising a speaker sound cavity structure, wherein the speaker sound cavity structure has an antenna supporting member arranged on a mobile terminal, the antenna supporting member comprising:
  a sound-guiding groove configured as a transmission channel for transmitting sound in an original speaker sound cavity of the mobile terminal, wherein the sound-guiding groove is a recess arranged on the antenna supporting member of the mobile terminal, and the sound-guiding groove is arranged near a bottom edge of a housing of the mobile terminal and along a direction substantially parallel to the bottom edge of the mobile terminal and substantially perpendicular to a right edge and a left edge of the mobile terminal;
  a lead-out hole configured to lead the sound in the original speaker sound cavity of the mobile terminal into a new speaker sound cavity, wherein the lead-out hole is a through hole that passes through the antenna supporting member of the mobile terminal, and is arranged at one end of the sound-guiding groove that connects an edge of the original speaker sound cavity; and
  a lead-in hole configured to guide the sound in the original speaker sound cavity of the mobile terminal into the new speaker sound cavity, wherein the lead-in hole is a through hole that passes through the antenna supporting member of the mobile terminal and is arranged at the other end of the sound-guiding groove that connects an edge of the new speaker sound cavity.

12. The mobile terminal of claim 11, wherein the lead-out hole and the lead-in hole are arranged at two ends of the sound-guiding groove, a bottom edge of the original speaker sound cavity is formed on an inner surface of the bottom edge of the housing of the mobile terminal, and a side edge of the original speaker sound cavity is formed on an inner surface of a side edge of the housing of the mobile terminal.

13. The mobile terminal of claim 11, wherein a polyethylene terephthalate film or foam is arranged on the sound-guiding groove.

14. The mobile terminal of claim 11, wherein foam is arranged on the original speaker sound cavity of the mobile terminal and the new speaker sound cavity of the mobile terminal.

15. The mobile terminal of claim 14, wherein a diameter of the lead-out hole and a diameter of the lead-in hole are between 0.5-2 mm, a width of the foam is between 0.3-1.5 mm, and the width of the foam is less than a width of the lead-out hole and the lead-in hole.

16. The mobile terminal of claim 11, wherein the antenna supporting member is fixedly connected with the mobile terminal using screws.

17. The mobile terminal of claim 11, wherein a width of the sound-guiding groove is between 0.5-2 mm.

* * * * *